United States Patent [19]

Schwartz et al.

[11] Patent Number: 4,468,255

[45] Date of Patent: Aug. 28, 1984

[54] RHEOLOGY MODIFIERS FOR ARYLIDE YELLOW PIGMENT DISPERSIONS AND PIGMENT DISPERSIONS CONTAINING SAME

[75] Inventors: Russell J. Schwartz, Guttenberg; Theodore Sulzberg, Highland Park, both of N.J.

[73] Assignee: Sun Chemical Corporation, New York, N.Y.

[21] Appl. No.: 521,686

[22] Filed: Aug. 10, 1983

[51] Int. Cl.$^3$ .............................................. C04B 31/40
[52] U.S. Cl. ......................... 106/288 Q; 106/308 Q; 260/193; 260/176
[58] Field of Search ..................... 106/288 Q, 308 Q; 206/193, 176

[56] References Cited

U.S. PATENT DOCUMENTS 3,169,955  2/1965  Siebert et al. ..................... 260/193
3,966,488  6/1976  Langenfelder et al. ........ 106/308 Q
3,991,044  11/1976  Conley ............................ 106/288 Q

*Primary Examiner*—John Kight
*Assistant Examiner*—M. L. Moore
*Attorney, Agent, or Firm*—Cynthia Berlow

[57] ABSTRACT

The flow and handling characteristics of arylide yellow and orange pigment dispersions are improved by incorporating in them a small amount of a rheology modifier that is the product obtained by reacting an arylide yellow or orange pigment with a primary diamine and a glycidyl ether.

17 Claims, No Drawings

RHEOLOGY MODIFIERS FOR ARYLIDE YELLOW PIGMENT DISPERSIONS AND PIGMENT DISPERSIONS CONTAINING SAME

This invention relates to rheology modifiers for arylide yellow pigment dispersions. More particulary, it relates to additives for use in nonaqueous arylide yellow pigment dispersions that improve their rheology, increase their pigment loading capacity, and facilitate their milling. It further relates to pigment dispersions that contain these rheology modifying additives.

BACKGROUND OF THE INVENTION

Non-aqueous arylide yellow and orange pigment dispersions, that is, concentrates, are widely used in the production of printing inks, paints, and plastics. Their use in many applications, however, has been restricted because it has not been possible to use them in the preparation of highlypigmented vechicles that have good fluidity.

BRIEF DESCRIPTION OF THE INVENTION

In accordance with this invention, it has been found that when arylide pigment dispersions are treated with rheology modifiers that are derived from the arylide pigments, the resulting pigment dispersions exhibit improved rheology, that is, a softer and more workable body and lower viscosity. This in turn can lead to the production of more highly-pigmented concentrates and can result in improved processing characteristics when the dispersions are used in the production of printing inks, paints, and plastics.

DETAILED DESCRIPTION OF THE INVENTION

The rheology modifiers that are used to improve the fluidity of non-aqueous arylide pigment dispersions can be prepared from either monoarylide or diarylide yellow pigments. The rheology modifiers derived from monoarylide yellow pigments have the structural formula

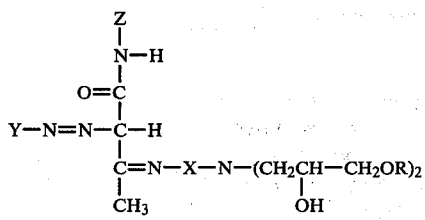

wherein X represents a divalent aliphatic group containing 4 to 54 carbon atoms; an aromatic group that may be, for example, phenylene, substituted phenylene, biphenylene, substituted biphenylene; or

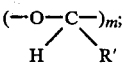

Y and Z each represents an aromatic group such as phenyl, halophenyl, alkylphenyl, biphenyl, alkoxyphenyl, phenylsulfonic acid, and nitrophenyl; R represents a monovalent aliphatic or aromatic group having 4 to 30 carbon atoms; R' represents hydrogen, alkyl, or aralkyl; and m is an integer in the range of 4 to 40.

Small amounts of a product derived from one molecule of amine and two molecules of monoarylide pigment and having the formula

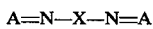

wherein A represents a residue of the monarylide pigment may be present.

When a diarylide yellow pigment is used, the rheology modifiers have the structural formula

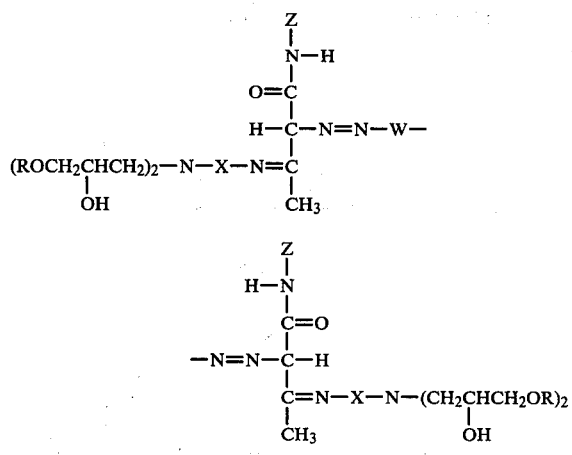

Small amounts of oligomeric products that have the structural formula

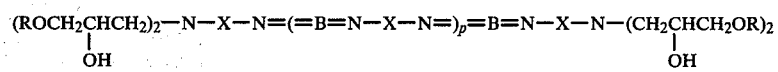

wherein B represents the residue of a diarylide pigment and p is an integer in the range of 1 to 4 may be present in the rheology modifiers prepared from diarylide pigments and W is a divalent version of Y.

The rheology modifiers are prepared by reacting a monoarylide or a diarylide yellow pigment with a primary diamine and a glycidyl ether. The preparation of a typical rheology modifier from Pigment Yellow 12 is shown in the following equations:

Equation A

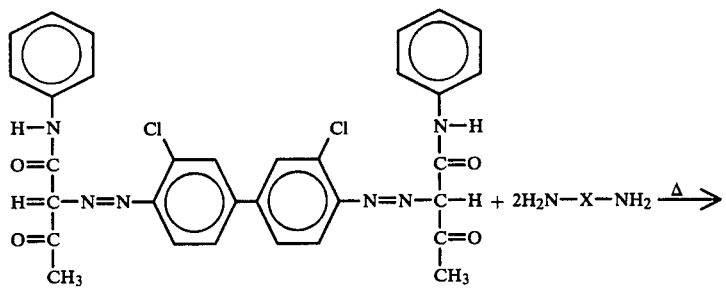

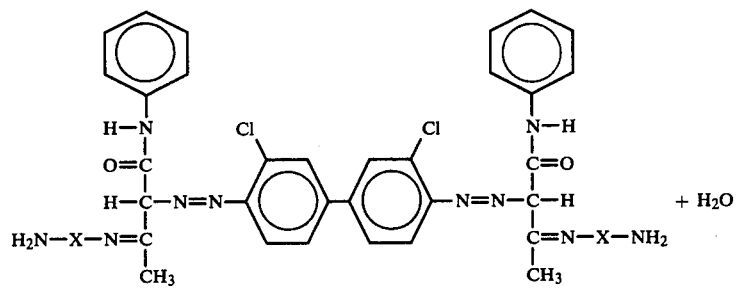

Equation B $I + 4ROCH_2-CH\underset{O}{-}CH_2 \xrightarrow{\Delta}$

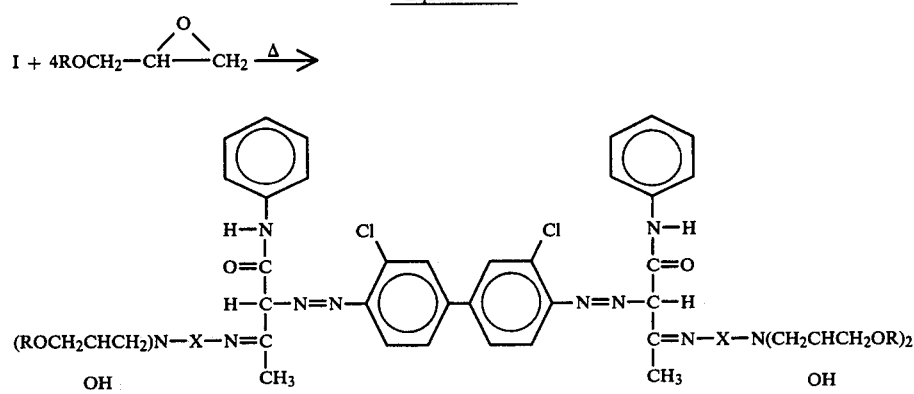

The arylide-type yellow and orange pigments that are used in the production of the novel rheology modifiers are azo pigments prepared by coupling a diazotized monoamine or tetrazotized diamine with acetoacetanilide, acetoacet-o-anisidide, or acetoacet-o-toluidide. Among the useful monoarylide pigments are Pigment Yellow 1, Pigment Yellow 73, Pigment Yellow 74, and Pigment Orange 1. Suitable diarylide pigments include Pigment Yellow 12, Pigment Yellow 14, Pigment Yellow 17, and Pigment Orange 16. These pigments are prepared from the diazotized monoamine and tetrazotized diamines and coupling agents shown in the following table:

TABLE

| Pigment | Diamine | Coupler |
|---|---|---|
| Pigment Yellow 1 | diazotized m-nitro-p-toluidine | acetoacetanilide |
| Pigment Yellow 73 | diazotized p-chloro-o-nitroaniline | acetoacet-o-anisidide |
| Pigment Yellow 74 | diazotized m-nitro-o-anisidine | acetoacet-o-anisidine |
| Pigment Orange 1 | diazotized m-nitro-p-anisidine | acetoacet-o-toluidide |
| Pigment Yellow 12 | tetrazotized 3,3'-dichlorobenzidine | acetoacetanilide |
| Pigment Yellow 14 | tetrazotized 3,3'-dichlorobenzidine | acetoacet-o-toluidide |
| Pigment Yellow 17 | tetrazotized 3,3'-dichlorobenzidine | acetoacet-o-anisidide |
| Pigment Orange 16 | tetrazotized o-dianisidine | acetoacetanilide |

The amines that can be used in the preparation of the novel rheology modifiers are primary diamines that have boiling points above 150° C. They include alkyl, aryl, and alkylaryl diamines that have the structural formula $H_2N-X-NH_2$ wherein X may be a divalent aliphatic group containing 4 to 54 carbon atoms; an aromatic group such as phenylene, substituted phenylene, biphenylene, substituted biphenylene; or

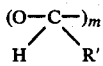

wherein R' is hydrogen, alkyl, or aralkyl, and m is an integer in the range of 4 to 40. Examples of these amines include phenylene diamine, diphenylenediamine, tetramethylene diamine, hexamethylene diamine, decane diamine, dodecane diamine, tetradecane diamine, diamines derived from dimerized fatty acids having 28 to 60 carbon atoms, polyethers containing two primary amine groups, and the like, and mixtures thereof. Particularly satisfactory results have been obtained using diamines derived from dimerized tall oil fatty acids, which are marketed as DP 3695 by Humko Chemical Company and polyoxypropyleneamines having the structural formula NH$_2$CH(CH$_3$)CH$_2$—[—OCH$_2$CH(CH$_3$)]$_x$NH$_2$ in which x is 30 to 35, which are marketed as Jeffamines by Texaco Chemical Company. The primary diamines may contain small amounts of primary triamines or higher analogs.

The monofunctional glycidyl ethers that are used in preparing the rheology modifiers have the structural formula

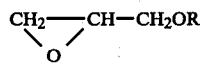

wherein R is an aliphatic or aromatic group having 4 to 30 carbon atoms. Illustrative of these ethers are phenyl glycidyl ether, butyl glycidyl ether, cresyl glycidyl ether, 2-ethylhexyl glycidyl ether, mixtures of C$_8$—C$_{14}$ alkyl glycidyl ethers, and the like, and mixtures thereof.

The rheology modifiers are generally prepared by a two-step procedure in which an arylide yellow or orange pigment is reacted with a diamine to form an intermediate that is then reacted with a glycidyl ether. In this procedure, the pigment is heated with the diamine at a temperature in the range of about 80° C. to 250° C., and preferably 150° C. to 180° C., until substantially all of the water evolved during the reaction has been removed, for example, by passing a stream of nitrogen through the reaction mixture. The glycidyl ether is added to the reaction mixture, and the mixture is heated at about 100° C. to 220° C., and preferably at 150° C. to 190° C., until all of the glycidyl group have reacted. In another embodiment of the invention, the first reaction is carried out in the presence of an inert organic solvent, such as xylene, toluene, hexane, or mineral spirits, which assists in the removal of water. When the reaction has been completed, the organic solvent is removed from the reaction mixture by distillation under vacuum.

In a preferred embodiment of the invention, a triamine or other catalyst is used to reduce the reaction temperature and/or the reaction time. For example, when 1.5 percent by weight or 4.5 percent by weight of Triamine T (which has the structural formula H$_2$N—(CH$_2$)$_3$—NH—(CH$_2$)$_3$—NH-tallow) was used, the time required for the first reaction was reduced to 4.5 hours or 3 hours, respectively, from the 8 to 9 hours ordinarily required in the absence of a catalyst.

In most cases, stoichiometrically equivalent amounts of the reactants are used in the preparation of the rheology modifiers. If desired, however, small excesses of the diamine and/or the glycidyl ether may be present in the reaction mixtures.

In the practice of this invention, pigment dispersions having improved fluidity are prepared by adding to a pigment concentrate or flush the amount of rheology modifier that will form a dispersion having the desired flow characteristics. The amount added is generally between about 5 percent and 40 percent, based on the weight of the pigment.

The pigment dispersions to which the rheology modifiers are added generally contain about 10 percent to 70 percent by weight of one or more arylide pigments and about 20 percent to 85 percent of an organic vehicle or flushing agent, which is usually a low viscosity alkyd or polyester resin. While the rheology modifiers are ordinarily used in arylide yellow or orange pigment dispersions, they can also be used to improve the fluidity of dispersions of other pigments, such as azo red pigments.

The method of dispersing or grinding the rheology modifier in the pigment dispersion is not critical provided that a smooth, uniform product is obtained. Examples of suitable equipment, which are well-known in the art, are ball, pebble, sand, roller, and colloid mills; kneader mixers; high-speed dispersers; or any other apparatus used in the preparation of pigment concentrates or flushes.

The pigment dispersions of this invention generally contain about 10 percent to 70 percent by weight of arylide yellow or orange pigment, about 20 percent to 85 percent by weight of an organic vehicle or flushing agent, and about 1.5 percent to 15 percent by weight of rheology modifier. They preferably contain about 15 to 50 percent by weight of pigment, about 50 to 80 percent by weight of an organic vehicle or flushing agent, and about 3 to 10 percent by weight of rheology modifier.

In addition to the pigment, vehicles, and rheology modifier, the pigment dispersions of this invention may contain viscosity modifiers, wetting agents, defoamers, biocides, and other conventional additives in the amounts ordinarily used for these purposes.

These pigment dispersions are characterized by excellent rheological properties, that is, they have better flow properties and are easier to handle and to mix with other materials used in ink manufacture than the comparable dispersions that do not contain the novel rheology modifiers.

When the pigment dispersions of this invention are used in the production of heat-set lithographic paste inks, the products obtained have improved gloss and rub-resistance, shorter set times, more transparency, and better heat stability.

The invention is further illustrated by the following examples wherein all parts are parts by weight.

EXAMPLE 1

(A) A mixture of 109 parts of Pigment Yellow 12 and 690 parts of polyoxypropylenediamine (Jeffamine D2000) was stirred for 30 minutes at 220° C. while a stream of nitrogen was passed through the mixture to remove from it the water formed by the reaction. The resulting dark colored transparent liquid was cooled. Infrared analysis of the product showed the disappearance of the peak at 1670$^{cm-1}$, which corresponds to the acetyl group that is present in the pigment.

(B) To 799 parts of the product of part (A) was added 201 parts of a mixture of C$_{12-14}$ alkyl glycidyl ethers (WC-8, Wilmington Chemical Corp.). The resulting solution was stirred for 2 hours at 175° C. IR and NMR spectroscopy showed that complete reaction had occurred.

(C) One part of the product of part (B) and 15 parts of a flush containing 42.5 percent of Pigment Yellow 12 and 57.5 percent of an alkyd-based flushing vehicle were thoroughly mixed. The product was softer, easier to transfer between vessels, and more workable than was the comparative product made by mixing 15 parts of the same yellow flush with 1 part of the alkyd-based flushing vehicle.

(D) A heat-set lithographic paste ink was prepared from the product of part (C). The ink was more transparent and had gloss, rub-resistance, water-emulsification, pH rise, and time-set equivalent to those of standard inks of the same formulation, but without the additive.

EXAMPLE 2

A mixture of 20 parts of Pigment Yellow 12, 40 parts of dimer amine (DP3695), and 40 parts of a high boiling petroleum distillate (Magie 470 Oil) was stirred for 2 hours at 180° C. On cooling, the dark transparent liquid became an orange paste. IR spectroscopy showed that the reaction was complete.

To the reaction mixture was added 36 parts of a mixture of $C_{12-14}$ alkyl glycidyl ethers (WC-8), and the resulting mixture was heated at 160° C. for 2.5 hours. On cooling, an orange paste was obtained.

When this modified pigment was added to a Pigment Yellow 73 flush, the product obtained had better rheological properties, i.e., better flow and easier handling, than a conventional flush at the same pigment concentration.

Heat-set lithographic inks made with this modified pigment flush were comparable in properties to conventional inks.

EXAMPLE 3

A mixture of 20 parts of Pigment Yellow 74, 34 parts of dimer amine (DP3695), and 34 parts of high boiling petroleum distillate (Magie 470 Oil) was stirred at 200° C. for 30 minutes. The resulting dark transparent liquid, which became a reddish paste on cooling, was shown by IR analysis to have the expected structure.

To this paste was added 55 parts of an epoxy compound derived from cashew nut oil (Cardolite NC513, Union Carbide Corp.), and the mixture was heated at 150° C. for 2 hours to form a dark transparent liquid which became a reddish paste on cooling. The composition of the product was confirmed by IR and NMR spectroscopy.

Pigment flushes that contained this product had much lower viscosity as compared to standard flushes. Heat-set lithographic inks prepared from pigment flushes that contained this product had improved transparency strength and gloss at reduced pigment levels.

EXAMPLE 4

A mixture of 25 parts of Pigment Yellow 14 and 150 parts of polyoxypropylenediamine (Jeffamine D2000) was stirred at 200° C. for 60 minutes while a stream of nitrogen was passed through the mixture to remove from it the water formed by the reaction. The product, which became a transparent viscous liquid on cooling, was shown by IR spectroscopy to be devoid of carbonyl bonds in the regions of $1670^{cm-1}$.

This product was mixed with 20 parts of butyl glycidyl ether, and the mixture was heated at 150° C. for 3 hours to form a transparent dark viscous liquid. It was used to make a pigment flush from Pigment Yellow 14 and a low viscosity alkyd resin. This modified flush had much better flow characteristics than the corresponding flush without the additive, and it was readily converted to a higher solids flush. An ink prepared from the modified pigment flush had properties comparable to those of a standard heat-set ink.

EXAMPLE 5

A mixture of 109 parts of Pigment Yellow 12, 690 parts of polyoxypropylenediamine (Jeffamine D2000), and 27 parts of xylene was heated at its reflux temperature (175° C.) until substantially all of the water formed by the reaction had been removed. 201 Parts of a mixture of $C_{12-14}$ alkyl glycidyl ethers (WC-8) was added, and the heating under reflux was continued until all of the glycidyl ether had reacted. Xylene was removed from the reaction mixture by vacuum distillation.

This product was reacted in a manner similar to that described in Example 1 (B) and 1 (C) to give a material whose characteristics were identical to those tested in Example 1 (D).

EXAMPLE 6

A mixture of 109 parts of Pigment Yellow 12, 657 parts of polyoxypropyleneamine (Jeffamine D2000), and 14 parts of N-octadecyldipropylenetriamine (Armosperse 30, Armak) was heated at 175° C. for 4.5 hours to give a product identical to the one described in Example 5.

From the above, it is evident that the advantages of this invention included savings of time, decreases in shipping costs, and improvements in ink properties.

What is claimed is:

1. A compound having the structural formula

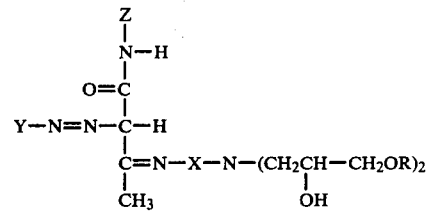

or the structural formula

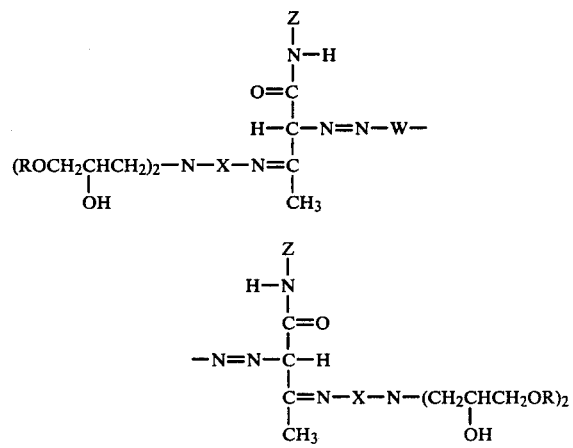

wherein X represents a divalent aliphatic group having 4 to 54 carbon atoms; an aromatic group; or

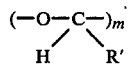

wherein R' represents hydrogen, alkyl, or aralkyl and m is an integer in the range of 4 to 40; W, Y, and Z each represents an aromatic group; and R represents an aliphatic or aromatic group having 4 to 30 carbon atoms.

2. The compound of claim 1 that has the structural formula

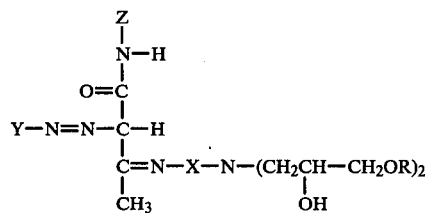

wherein X, Z, and R have the aforementioned significance.

3. The compound of claim 1 that has the structural formula

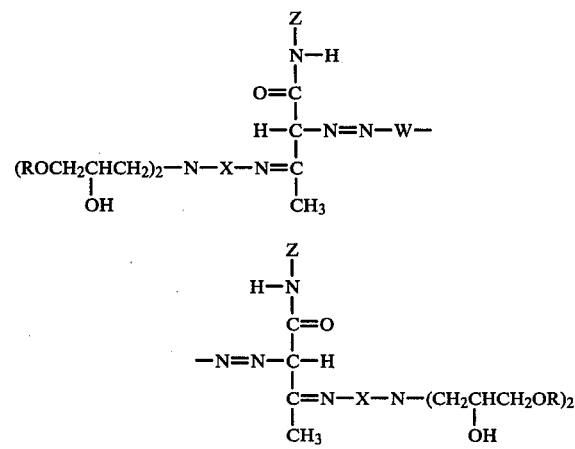

wherein W, X, Z, and R have the aforementioned significance.

4. A composition that comprises the compound of claim 2 and a small amount of a compound having the structural formula

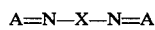

wherein A represents the residue of a monoarylide pigment and X has the aforementioned significance.

5. A composition that comprises the compound of claim 3 and a small amount of an oligomeric product having the structural formula

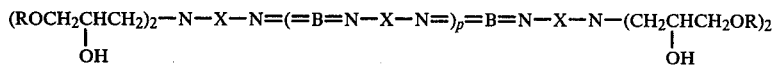

wherein B represents the residue of a diarylide pigment, p is an integer in the range of 1 to 4, and R, W, and X have the aforementioned significance.

6. A process for the production of the compounds of claim 1 that comprises the steps of
 (a) heating equivalent amounts of an arylide yellow pigment with a primary diamine at a temperature in the range of about 80° C. to 250° C. until substantially all of the water evolved during the reaction has been removed from the reaction mixture and then
 (b) heating the reaction mixture with an equivalent amount of a glycidyl ether at a temperature in the range of about 100° C. to 220° C. until substantially all of the glycidyl ether has reacted.

7. The process of claim 6 wherein the arylide yellow pigment is a monarylide yellow pigment.

8. The process of claim 6 wherein the arylide yellow pigment is a diarylide yellow pigment.

9. The process of claim 6 wherein the reaction of step (a) is carried out at a temperature in the range of about 150° C. to 190° C.

10. The process of claim 6 wherein the reaction of step (a) is carried out in the presence of an inert organic solvent.

11. The process of claim 6 wherein the reaction of step (a) is carried out in the presence of xylene.

12. A pigment dispersion having improved rheological properties that comprises 10 percent to 70 percent by weight of an arylide yellow or orange pigment, 20 percent to 85 percent by weight of an organic vehicle, and 1.5 percent to 15 percent by weight of rheology modifier that is a compound having one of the structural formulas set forth in claim 1.

13. The pigment dispersion of claim 12 wherein the rheology modifier is a compound having the structural formula of claim 2.

14. The pigment dispersion of claim 12 wherein the rheolgoy modifier is a compound having the structural formula of claim 3.

15. A method of improving the rheological properties of an arylide yellow or orange pigment dispersion that comprises about 10 percent to 70 percent by weight of an arylide pigment and about 20 percent to 85 percent by weight of an organic vehicle that comprises incorporating in the pigment dispersion about 3 percent to 10 percent, based on the weight of pigment in the dispersion, of a rheology modifier that is a compound having one of the structural formulas of claim 1.

16. The method of claim 15 wherein the rheology modifier is a compound having the structural formula of claim 2.

17. The method of claim 15 wherein the rheology modifier is a compound having the structural formula of claim 3.

* * * * *